United States Patent
Culley et al.

(10) Patent No.: US 7,783,876 B2
(45) Date of Patent: Aug. 24, 2010

(54) COMPARING CHARACTERISTICS PRIOR TO BOOTING DEVICES

(75) Inventors: Paul R. Culley, Tomball, TX (US); Kevin B. Leigh, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 667 days.

(21) Appl. No.: 11/742,594

(22) Filed: May 1, 2007

(65) Prior Publication Data

US 2008/0276082 A1    Nov. 6, 2008

(51) Int. Cl.
*G06F 15/177* (2006.01)
(52) U.S. Cl. .............................. 713/2; 713/1; 713/100
(58) Field of Classification Search .............. 713/1, 713/2, 100
See application file for complete search history.

(56) References Cited

U.S. PATENT DOCUMENTS

| | | | |
|---|---|---|---|
| 4,504,821 A | 3/1985 | Barnes | |
| 5,203,004 A | 4/1993 | Bunton et al. | |
| 5,299,203 A * | 3/1994 | Steele | 714/724 |
| 5,768,632 A | 6/1998 | Husted et al. | |
| 6,615,264 B1 | 9/2003 | Stoltz et al. | |
| 6,982,780 B2 | 1/2006 | Morley et al. | |
| 6,983,385 B2 | 1/2006 | German et al. | |
| 7,043,569 B1 * | 5/2006 | Chou et al. | 710/8 |
| 7,330,979 B1 * | 2/2008 | Hazard | 713/193 |
| 2002/0122052 A1 | 9/2002 | Reich et al. | |
| 2003/0045952 A1 | 3/2003 | Danan | |
| 2003/0145137 A1 | 7/2003 | Huckins | |
| 2003/0158993 A1 | 8/2003 | Moy | |
| 2004/0221084 A1 | 11/2004 | Yates et al. | |
| 2006/0123165 A1 * | 6/2006 | Narad | 710/104 |
| 2007/0240213 A1 * | 10/2007 | Karam et al. | 726/22 |

FOREIGN PATENT DOCUMENTS

| | | |
|---|---|---|
| EP | 0436891 A2 | 7/1991 |
| KR | 4047578 A | 6/2004 |
| WO | 99/66409 A1 | 12/1999 |
| WO | 2005/008385 A2 | 1/2005 |

* cited by examiner

*Primary Examiner*—Nitin C Patel

(57) ABSTRACT

A system that comprises a first electronic device comprising a non-volatile memory. The system also comprises another electronic device in communication with the first electronic device and comprising a second non-volatile memory. The system further comprises a control logic coupled to the first and second electronic devices. Each of the non-volatile memories stores electrical characteristics associated with a corresponding electronic device. Prior to booting up the first or second electronic device, the control logic obtains and compares at least some of the electrical characteristics and disables the communication as a result of the comparison.

20 Claims, 3 Drawing Sheets

COMPARING CHARACTERISTICS PRIOR TO BOOTING DEVICES

BACKGROUND

Multiple electronic devices may be coupled to each other to transmit data between the devices. For example, in an electronic equipment cabinet such as a server rack, a server may couple to a switch via a backplane. In some cases, the devices may be incompatible in one or more regards. For instance, the electrical characteristics of one device may be incompatible with the electrical characteristics of the device to which it couples. In these cases, it is possible for one or more incompatible devices to be damaged when they are powered on.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

As used herein, the term "electrical characteristic(s)" refer to information associated with electrical properties of a device. For example, the electrical characteristics of a device may indicate how much current it can safely receive, the voltage level it can safely receive, the minimum or maximum current/voltage levels of a device with which it can safely communicate, etc.

DETAILED DESCRIPTION

The following discussion is directed to various embodiments. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Described herein are techniques by which two or more electronic devices coupled to each other are tested for compatibility before the devices are powered on. More specifically, electrical characteristics associated with the electronic devices are stored in non-volatile memory and are accessed before the devices are powered up to test compatibility. If two or more coupled devices are determined to be incompatible with each other, communication between the devices is disabled prior to powering on the devices. When the devices are powered on, the incompatible devices are unable to communicate with each other, thereby preventing any damage that would have occurred to the devices due to their incompatibility if the devices were permitted to communicate with each other.

Figure 1:
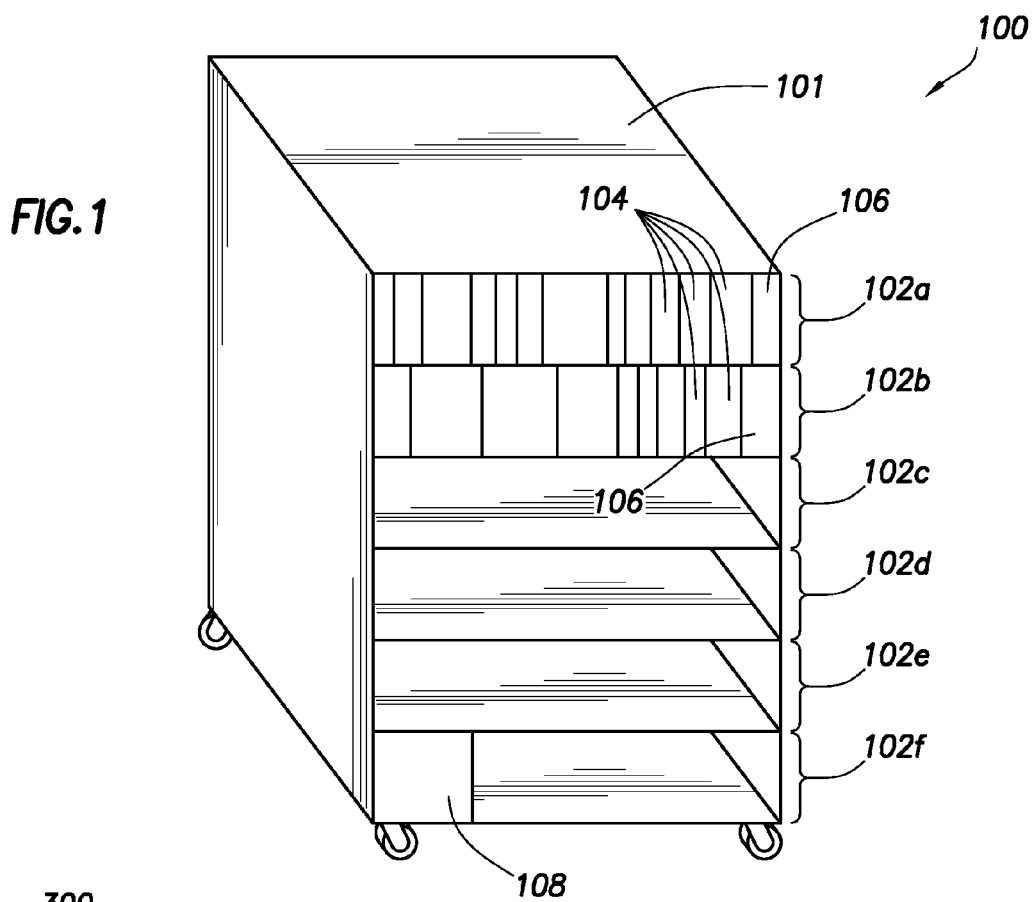
FIG. 1 shows a block diagram of an electrical container, in accordance with various embodiments.

FIG. 1 shows an illustrative system 100 comprising an electronic device container 101. The container 101 may have, for example, a cuboidal shape and may be composed of metal, plastic, fiberglass and/or any other suitable material. In at least some embodiments, the container 101 may comprise an equipment rack such as a server rack. The container 101 comprises a plurality of enclosures 102a-102f. Each enclosure is capable of storing one or more electronic devices 104 (e.g., blade servers, switches, input/output devices, power supplies). The electronic devices are controlled by one or more enclosure managers 106. In some embodiments, each enclosure has its own enclosure manager 106 which manages electronic devices 104 in that enclosure, as shown in FIG. 1. In other embodiments, the container 101 may have a single enclosure manager which manages some or all electronic devices in the container 101. In still other embodiments, the container 101 may have a primary enclosure manager that manages secondary enclosure managers which, in turn, manage the electronic devices. Other management techniques also are possible and are within the scope of this disclosure. In at least some embodiments, each enclosure manager comprises circuit logic including a processor, a storage (e.g., random access memory (RAM), non-volatile memory (NVM)), etc. (shown in FIG. 2b). In addition to enclosure managers and electronic devices, one or more power supplies 108 may be included in the container 101. Such power supplies may convert alternating current (AC) power to one or more suitable direct current (DC) voltages for the various electronic devices 104 and enclosures 106. The container 101 also comprises a backplane (shown in FIGS. 2a and 2b) which may be used to provide power to the electronic devices 104, to provide communication links between one or more electronic devices 104, etc. The various connections implemented in the backplane are collectively known as the backplane's "connection topography."

Figure 2A:
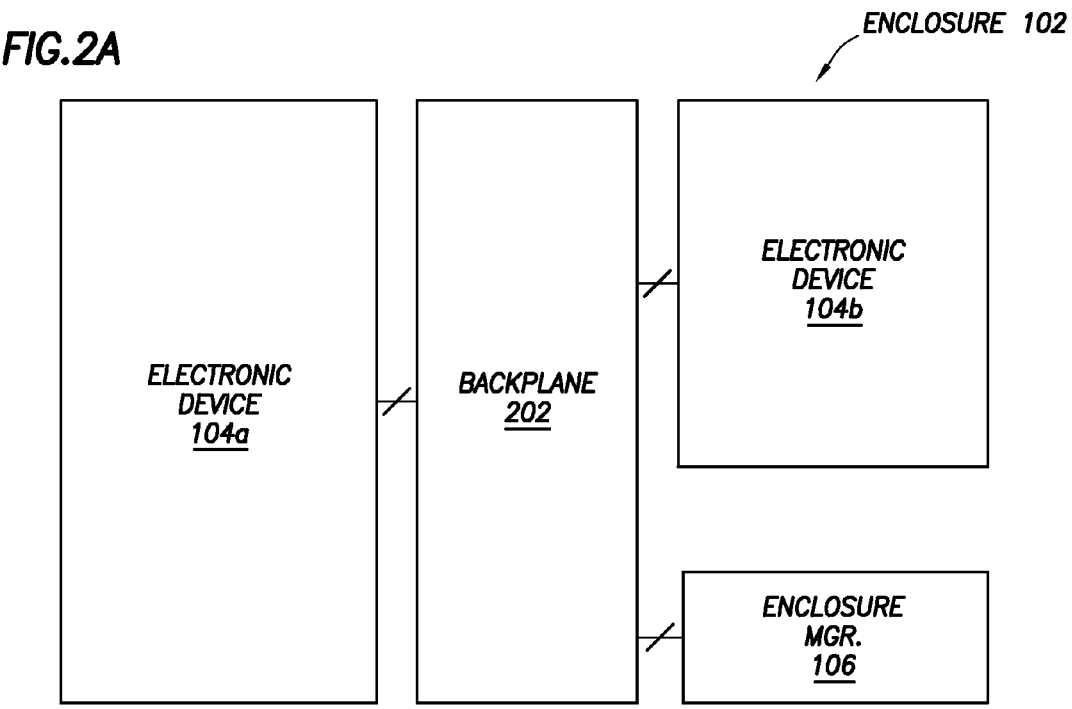
FIG. 2a shows a block diagram of an enclosure of the container of FIG. 1, in accordance with embodiments.

FIG. 2a shows a block diagram of at least some of the contents of an enclosure of the container 101 of FIG. 1. Specifically, FIG. 2a shows an enclosure 102 comprising an electronic device 104a and an electronic device 104b coupled via a backplane 202. The enclosure manager 106 couples to the backplane 202 and to the electronic devices 104a and 104b via the backplane 202. In operation, each of the electronic devices 104a and 104b comprises an NVM (e.g., an electrically erasable programmable read only-memory (EEPROM)) which, in turn, comprises information regarding the corresponding electronic device. Similarly, the backplane 202 comprises an NVM (e.g., an EEPROM) which, in turn, comprises information regarding the backplane 202. The NVMs may contain information such as, for example, electrical characteristics associated with the corresponding electronic device(s) or backplane. In at least some embodiments, the enclosure manager 106 comprises a processing logic and a storage comprising software (shown in FIG. 2b). When executed by the processing logic, the software causes the processing logic to determine electrical characteristics associated with the electronic devices 104a and 104b from their NVMs. The processing logic compares the electrical characteristics of the electronic devices 104a and 104b and determines whether the devices 104a and 104b are electrically compatible or incompatible. If the devices are incompatible, the processing logic accesses the NVM of the backplane 202 to determine which of the one or more connections between the devices 104a and 104b should be disabled. Based on this information, the processing logic disables communication between the devices 104a and 104b such that, when powered on, the devices 104a and 104b cannot be damaged. Although the above-mentioned comparison process occurs before the devices are powered on, in at least some embodiments, the devices 104a and 104b receive enough auxiliary power to provide the enclosure manager 106 with the information the enclosure manager 106 needs to perform the comparison. Further, although the embodiments described herein primarily involve comparison of electrical characteristics, any type of characteristics may be used.

In at least some embodiments, auxiliary power is provided to devices (e.g., devices 104a and 104b) such that one or more selected components on the devices receive power but the devices are not fully powered-on, nor do the devices receive enough power to boot up. Referring briefly to FIG. 1, in some such embodiments, a power supply 108 receives alternating current (AC) power and outputs direct current (DC) power to the devices in the container 101. In turn, the devices receive the DC power and, using one or more DC-to-DC converters, step down the received voltage to one or more voltages suitable for that device. For example, a device power supply may receive 120 V and may step down the voltage to 12 V, which may be used to power the entire device as a primary voltage, and also may step down the voltage to 3.3 V, which may be used to power selected components as an auxiliary device. Various power supply architectures may be implemented in the system 100 and are included within the scope of this disclosure.

Figure 2B:
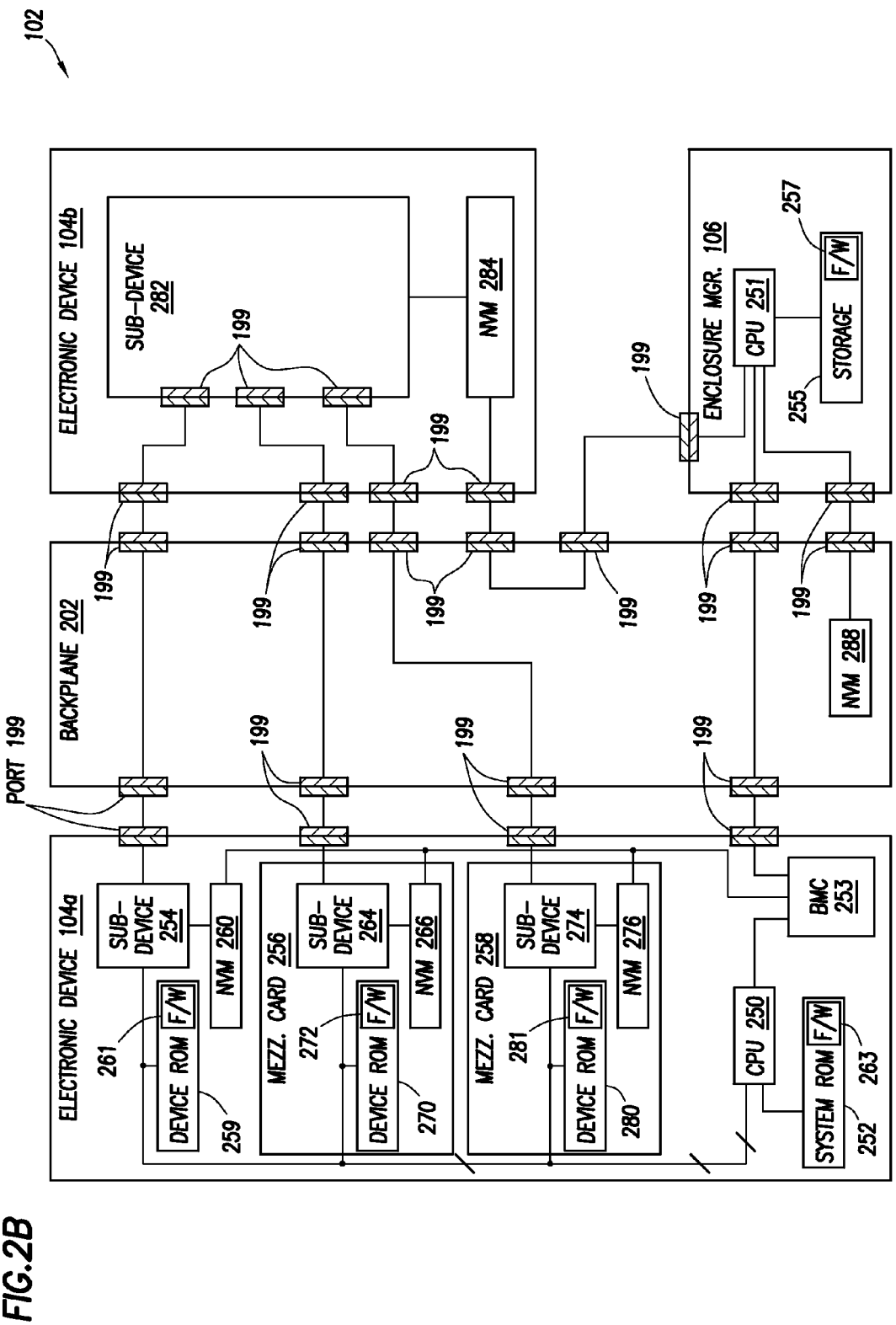
FIG. 2b shows a detailed version of the block diagram of FIG. 2a, in accordance with various embodiments.

FIG. 2b shows a detailed view of the enclosure 102 of FIG. 2a. Specifically, FIG. 2b shows at least some of the contents of the electronic devices 104a and 104b, the backplane 202 and the enclosure manager 106, each of which is now discussed in turn. The electronic device 104a comprises a processing logic such as a central processing unit (CPU) 250, a baseboard management controller (BMC) 253 and a system read-only memory (ROM) 252 comprising firmware 263. The electronic device 104a further comprises a sub-device 254 coupled to an NVM 260 (e.g., an EEPROM) and to a device ROM 259 comprising firmware 261. The electronic device 104a also comprises two mezzanine cards 256 and 258, possibly mounted on a motherboard (not shown) of the device 104a. The mezzanine card 256 comprises a sub-device 264 coupled to an NVM 266 (e.g., an EEPROM) and to a device ROM 270 comprising firmware 272. Similarly, the mezzanine card 258 comprises a sub-device 274 coupled to an NVM 276 (e.g., an EEPROM) and to a device ROM 280 comprising firmware 281. The electronic device 104a comprises a plurality of ports 199 by which circuit logic housed within the device 104a communicates with circuit logic external to the device 104a. Each of the NVMs 260, 266 and 276 comprises information (e.g., electrical characteristics) associated with its respective device.

The electronic device 104b comprises a sub-device 282 (e.g., a network switch) coupled to an NVM 284 (e.g., an EEPROM). The NVM 284 stores information (e.g., electrical characteristics) associated with the sub-device 282 and/or the electronic device 104b in general. The sub-device 282 comprises a plurality of ports 199 by which circuit logic inside the sub-device 282 communicates with circuit logic external to the sub-device 282. Similarly, the electronic device 104b comprises a plurality of ports 199 by which circuit logic inside the electronic device 104b communicates with circuit logic external to the electronic device 104b.

The backplane 202 comprises a plurality of ports 199 which facilitate communications between one or more electronic devices (e.g., between devices 104a, 104b and the enclosure manager 106). The backplane 202 comprises an NVM 288 (e.g., an EEPROM). The NVM 288 is programmed with information pertaining to the various interconnections (i.e., the connection topography) the backplane provides between devices housed in the enclosure 102. For example, the NVM 288 "knows" that the sub-device 254 and the mezzanine cards 256 and 258 all couple to the sub-device 282 via ports 199.

The enclosure manager 106 comprises a processing logic such as a central processing unit (CPU) 251 coupled to a storage 255 (e.g., a combination of ROM and RAM) comprising firmware 257. As with the devices described above, the enclosure manager 106 comprises multiple ports 199 by which the enclosure manager 106 communicates with circuit logic outside the manager 106. The operation of the enclosure 102 is now described.

Referring to FIG. 1, as previously explained, if a device in the container 101 is coupled to another device and the two devices are electrically mismatched, one or both of the devices may be damaged upon being powered on. Thus, in accordance with various embodiments, each enclosure manager 106 in the container 101 determines the electrical characteristics of the various devices in its corresponding enclosure. These electrical characteristics are stored in NVMs of the devices. If an enclosure manager detects incompatibility between two devices that might result in damage upon powering on, the enclosure manager disables communication between the two devices before they are powered on. In this way, when the devices are powered on, they are unable to communicate with each other, thereby preventing damage due to electrical incompatibility.

Referring to FIG. 2b, before either of the electronic devices 104a or 104b is booted up, firmware 257 stored in the enclosure manager 106 is executed by the CPU 251. The time of execution may be set as desired (for example, by programming the enclosure manager 106 to execute the firmware 257 at a predetermined time). When executed, the firmware 257 causes the CPU 251 to gather electrical characteristics from the NVMs 260, 266, 276 and 284 and connection topology information from the NVM 288. In some embodiments, the CPU 251 may collect electrical characteristics from additional NVMs, depending on the number of electronic devices that couple to the backplane 202.

In some embodiments, the CPU 251 may gather these electrical characteristics directly from the NVMs. However, in other embodiments, the CPU 251 collects the electrical characteristics from the NVMs indirectly, instead using a path 300 shown in FIG. 3a. For purposes of illustration, the path 300 will now be discussed in the context of the enclosure manager 106 accessing the electrical characteristics of the NVM 260. However, the path 300 may be used to access other NVMs as well. The path 300 begins with the enclosure manager 106 initiating a request for information from the NVM 260 (block 302). The request is initiated by the CPU 251 as a result of the CPU 251 executing the firmware 257. The request is transferred to the BMC 253 (block 304). The BMC 253 serves as a control logic for the electronic device 104a. In such a capacity, the BMC 253 receives the request and forwards the request to the CPU 250 (block 306). Upon receiving the request, the CPU 250 executes firmware 263. The firmware 263 is programmed to cause the CPU 250 determine where the request should be forwarded. Using information embedded in the request (e.g., one or more bits indicating that the request destination is the NVM 260) and the firmware 263, the CPU 250 determines that the request is intended for the NVM 260.

Figure 3A:
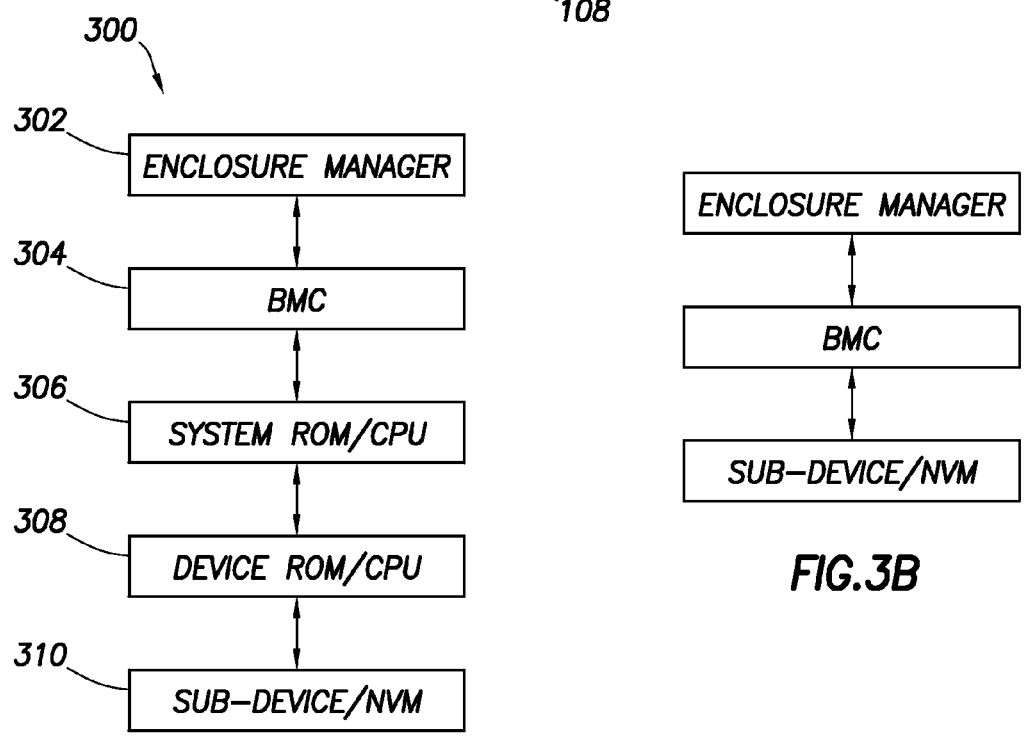
FIG. 3a shows a path used for communications in the block diagram of FIG. 2b, in accordance with embodiments.

Accordingly, the CPU 250 begins to execute the firmware of the device ROM which is associated with the intended NVM (block 308). More specifically, in this example, the CPU 250 begins to execute firmware 261 of device ROM 259, which is associated with the intended recipient of the request, NVM 260. The firmware 261 causes the CPU 250 to access the electrical characteristics stored in the NVM 260. In some embodiments, the CPU 250 is able to access the NVM 260 directly. In other embodiments, the CPU 250 requests the sub-device 254 to access the NVM 260 for the CPU 250 (block 310). Either technique may be used to access electrical characteristics stored in the NVM 260. Once obtained from the NVM 260, the electrical characteristics are sent to the CPU 250, and the CPU 250 sends the electrical characteristics to the enclosure manager 106 via the BMC 253. The path 300 described in FIG. 3a is illustrative of some embodiments. The scope of this disclosure is not limited to this specific path. Any suitable technique for accessing information stored in NVMs may be used.

Figure 3B:
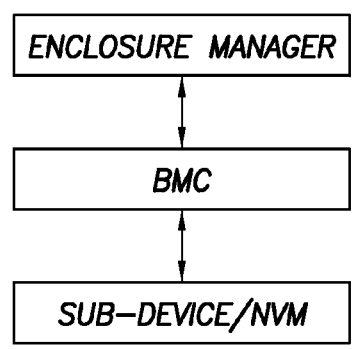
FIG. 3b shows another path used for communications in the block diagram of FIG. 2b, in accordance with embodiments.

For example, in some embodiments, the enclosure manager 106 may obtain information from an NVM, such as the NVM 260, using a more direct path. As described in FIG. 3b, in such embodiments, a request for information is initiated by the CPU 251 as a result of the CPU 251 executing the firmware 257 (block 352). The request is transferred to the BMC 253 (block 354). As explained, the BMC 253 serves as a control logic for the electronic device 104a. In such a capacity, the BMC 253 receives the request and forwards the request to the NVM 260 (block 356). In this way, the BMC 253 accesses the electrical characteristics stored in the NVM 260. Once obtained from the NVM 260, the electrical characteristics are sent from the BMC 253 to the enclosure manager 106.

Referring again to FIG. 2b, electrical characteristics stored in the NVMs 260, 266 and 276 may be accessed as shown in the path 300 of FIG. 3a or using any other suitable technique. In addition to collecting electrical characteristics from the NVMs 260, 266 and 276, the enclosure manager 106 also collects electrical characteristics pertaining to the electronic device 104b from the NVM 284 and the connection topology of the enclosure 102 from the NVM 288 of the backplane 202. In particular, execution of the firmware 257 causes the CPU 251 to access the NVM 284 via the backplane 202, as shown in FIG. 2. The CPU 251 accesses the information pertaining to the connection topology of the enclosure 102 directly from the NVM 288, as shown in FIG. 2. In this way, the enclosure manager 106 collects the electrical characteristics information stored in the NVMs 260, 266, 276 and 284 as well as the connection topology information stored in the NVM 288. The enclosure manager 106 stores the collected information in, for example, the storage 255.

As previously mentioned, although the electronic devices 104a and 104b are powered down, the enclosure manager 106 is able to collect information from the devices 104a and 104b because the devices 104a and 104b are supplied with enough auxiliary power to provide the enclosure manager 106 with the needed information. Further, because non-volatile memories are used, electrical characteristics and connection topography information is available even when the devise are not powered on. In some embodiments, the electrical characteristics and connection topography information may be manually programmed into the NVMs by an end-user. In other embodiments, the NVMs may be automatically programmed by the devices. In still other embodiments, some of the NVMs may be manually programmed while the other NVMs are automatically programmed.

After the enclosure manager 106 (i.e., the CPU 251) has collected the electrical characteristics information from the NVMs 260, 266, 276 and 284 and the topology information from the NVM 288, the enclosure manager 106 compares the electrical characteristics information in light of the topology information to determine whether two or more devices which are coupled together are electrically mismatched. For example, referring to FIG. 2b, a sub-device 264 in the electronic device 104a may be a fibre-channel device, while the sub-device 282 is an Ethernet switch. These two devices are electrically incompatible. In such a case, the enclosure manager 106 disables communication between the two or more mismatched sub-devices.

In some embodiments, the enclosure manager 106 disables communication between devices or sub-devices using the path 300 shown in FIG. 3a. Referring to FIGS. 2 and 3, for example, if the sub-device 254 is electrically mismatched with the sub-device 282, the enclosure manager 106 may deactivate a port 199 associated with the sub-device 254. Specifically, the enclosure manager 106 may send a deactivation request to the BMC 253 (blocks 302 and 304). In turn, the BMC 253 may forward the deactivation request to the CPU 250 (block 306). The firmware 263 may cause the CPU 250 to execute firmware 261 of device ROM 259 (block 308). The firmware 261 may cause the CPU 250 to instruct the sub-device 254 to deactivate its port 199 by sending the sub-device 254 the deactivation request (block 310). Accordingly, the sub-device 254 deactivates the port 199 to which it is directly connected. In this way, communication between the sub-devices 254 and 282, which are electrically mismatched, is disabled. Thus, damage to the sub-devices 254 and 282 is prevented.

After the sub-device 254 has disabled its port 199, the sub-device 254 may send a confirmation signal to the CPU 251 (e.g., following path 300 in reverse). In some embodiments, once the CPU 251 has received the confirmation signal, the CPU 251 permits the electronic devices 104a and 104b and their sub-devices 254, 264, 274 and 282 to be powered on. In cases where multiple deactivation requests were transferred to different devices or sub-devices, the CPU 251 may wait until a confirmation in response to each deactivation request has been received. The CPU 251 may then allow the devices and sub-devices to be powered on. In still other embodiments, the architecture of the devices 104a, 104b and the backplane 202 may be such that the CPU 251 may allow non-mismatched devices to be powered on while mismatched devices stay powered off until communication between the mismatched devices has been disabled. Any and all such variations are included within the scope of this disclosure.

Although the above description indicates that the port 199 directly connected to the sub-device 254 is disabled, in some embodiments, the enclosure manager 106 may disable any port or ports between the sub-devices 254 and 282 that would prevent communication between the sub-devices 254 and 282. For example, in some embodiments, the architecture of the enclosure 102 may be such that the enclosure manager 106 disables one of the ports 199 of the backplane 202 that couple the sub-devices 254 and 282. Similarly, the enclosure manager 106 may disable the port 199 of the sub-device 282 which couples to the sub-devices 254. Any number of ports (i.e., one or more) may be disabled to prevent communication between multiple incompatible devices. Any such variations are included within the scope of this disclosure.

Other types of variations also are possible. For example, although the embodiments disclosed herein are described primarily in terms of disabling communications between devices when the devices are mismatched, in some embodiments, devices between which there is no communication may be provided with communication if it is determined that the two devices are compatible. For instance, briefly referring to FIG. 2B, sub-devices 254 and 282 may not be in communication with each other. If, however, it is determined that the sub-devices 254 and 282 are compatible (i.e., not mismatched), the sub-devices 254 and 282 may be enabled to communicate with each other. The technique(s) by which this compatibility is determined and sub-devices are thus enabled may be similar to those used to determine incompatibility and to disable communications between sub-devices, as described herein.

In some embodiments, the enclosure manager 106 may couple to a user display 197. The display 197 may be used to display any suitable information pertaining to the status of the enclosure 102. For example, the display may show requests for electrical characteristics information and associated statuses, mismatched devices or sub-devices, deactivation requests and associated statuses, which devices or sub-devices have been powered on and which are powered off, etc.

Figure 4:
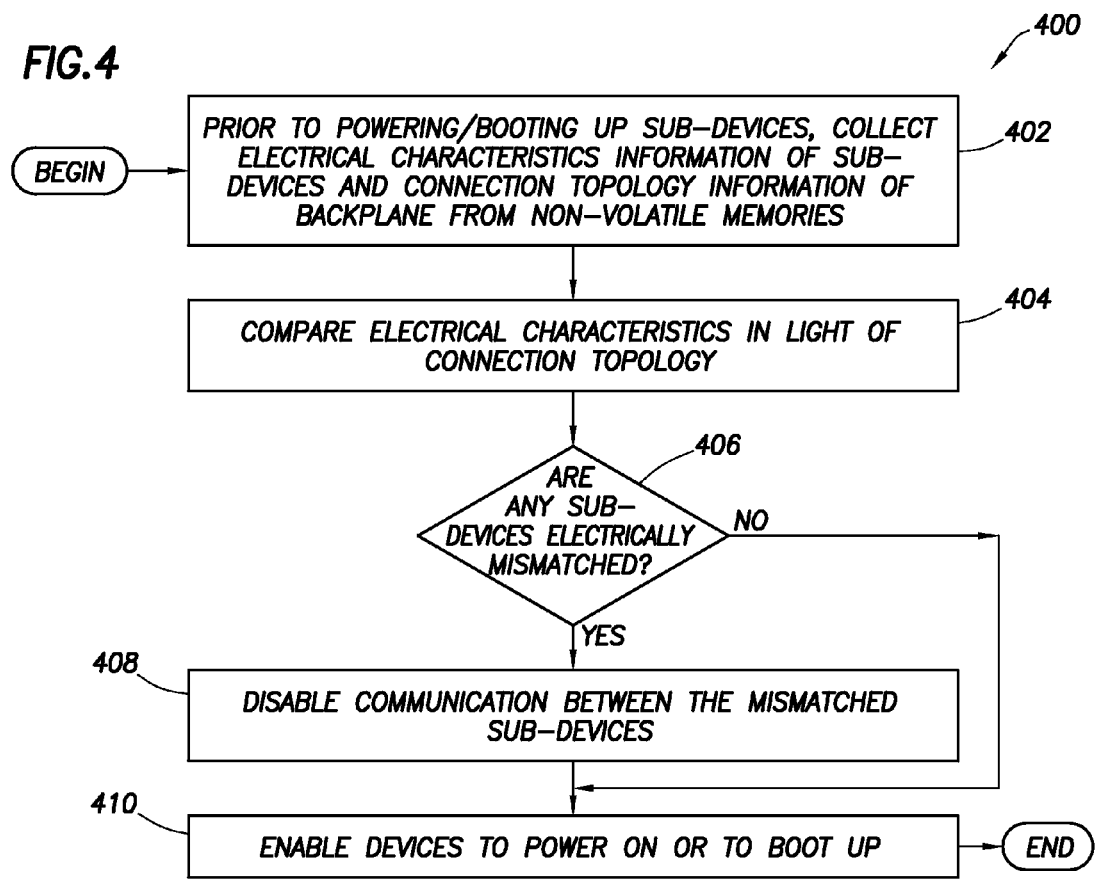
FIG. 4 shows a flow diagram of a method implemented in accordance with various embodiments.

FIG. 4 shows a flow diagram of a method 400 implemented in accordance with various embodiments. The method 400 begins by collecting electrical characteristics information of sub-devices and connection topology information of the backplane from non-volatile memories (block 402). The collection of this information occurs prior to powering on (or, in some embodiments, prior to booting up) at least some of the sub-devices. The method 400 continues by comparing the electrical characteristics in light of the connection topology (block 404). If it is determined that any coupled sub-devices are electrically mismatched (block 406), the method 400 comprises disabling communications between the mismatched sub-devices (block 408). The method 400 also comprises enabling the sub-devices to power on and/or boot up (block 410). The steps of the method 400 may be performed in any suitable method and are not limited to the order shown in FIG. 4.

The above discussion is meant to be illustrative of the principles and various embodiments. Numerous variations and modifications will become apparent to those skilled in the art once the above disclosure is fully appreciated. For example, although the above embodiments are described primarily in terms of server rack enclosures, any embodiment having a control logic, multiple electronic devices and NVMs may implement the techniques disclosed herein. It is intended that the following claims be interpreted to embrace all such variations and modifications.

What is claimed is:

1. A system, comprising:
a first electronic device comprising a non-volatile memory;
a second electronic device comprising another non-volatile memory; and
a control logic coupled to the first and second electronic devices;
wherein each of the non-volatile memories stores electrical characteristics associated with a corresponding electronic device;
wherein, prior to the first or second electronic device booting up, the control logic obtains and compares at least some of said electrical characteristics and disables communication between the first and second electronic devices as a result of said comparison.

2. The system of claim 1, wherein at least one of said first and second electronic devices comprises a blade server.

3. The system of claim 1, wherein said first electronic device comprises circuit logic inside a blade server and the second electronic device comprises a network switch.

4. The system of claim 1 further comprising:
a backplane coupling the first and second electronic devices, said backplane comprising a different non-volatile memory storing information associated with a connection topology of the backplane;
wherein the control logic uses said connection topology to compare the at least some of said electrical characteristics.

5. The system of claim 1, wherein the system comprises a server rack enclosure and the control logic comprises an enclosure manager.

6. The system of claim 1, wherein the control logic disables said communication by disabling a port used to couple the first and second electronic devices.

7. The system of claim 1, further comprising:
a central processing unit (CPU) coupled to the first and second electronic devices;
a baseboard management controller (BMC) coupled to the CPU; and
a read-only memory (ROM) coupled to the CPU and comprising firmware;
wherein the control logic obtains said electrical characteristics from the non-volatile memories by submitting requests to the BMC, and wherein the BMC provides the requests to the CPU;
wherein, upon execution, the firmware causes the CPU to forward the requests to logic associated with the non-volatile memories.

8. A system, comprising:
processing logic; and
a storage coupled to the processing logic and comprising executable code which, when executed, causes the processing logic to:
collect electrical characteristics associated with multiple electronic devices coupled to each other, said characteristics collected from multiple non-volatile memories;
compare the electrical characteristics to determine whether the multiple electronic devices are mismatched; and
if said multiple electronic devices are mismatched, disable communication between the mismatched electronic devices prior to powering on said mismatched electronic devices.

9. The system of claim 8, wherein said system comprises an enclosure manager of a server rack enclosure.

10. The system of claim 8, wherein said multiple electronic devices include a blade server and a network switch.

11. The system of claim 8, wherein said multiple electronic devices include a network switch and circuit logic housed within a server.

12. The system of claim 8 further comprising:
a backplane coupling the multiple electronic devices, said backplane comprising another non-volatile memory storing information associated with a connection topology of the backplane;
wherein the processing logic uses said connection topology to compare the electrical characteristics.

13. The system of claim 8, wherein the processing logic disables said communication by disabling a port used to couple the mismatched electronic devices.

14. The system of claim 8, further comprising:
a central processing unit (CPU) coupled to the multiple electronic devices;
a baseboard management controller (BMC) coupled to the CPU; and
a read-only memory (ROM) coupled to the CPU and comprising firmware;
wherein the processing logic collects said electrical characteristics from the non-volatile memories by submitting requests to the BMC, and wherein the BMC provides the requests to the CPU;
wherein, upon execution, the firmware causes the CPU to forward the requests to logic associated with the non-volatile memories.

15. The system of claim 8, wherein, when executed, the executable code causes the processing logic to enable communications between said multiple electronic devices if said multiple electronic devices are not mismatched.

16. A method, comprising:
collecting information pertaining to multiple, coupled devices from non-volatile memories associated with the multiple devices, said information collected prior to booting up at least one of said multiple devices;
comparing said information to determine whether said multiple, coupled devices are electrically mismatched; and
if said multiple, coupled devices are electrically mismatched, disabling communication between at least some of said multiple, coupled devices.

17. The method of claim 16, wherein said multiple, coupled devices include a blade server and a network switch.

18. The method of claim 16, wherein said multiple, coupled devices include a network switch and circuit logic housed within a server.

19. The method of claim 16 further comprising:
coupling the multiple devices using a server rack backplane, said backplane comprising another non-volatile memory storing information associated with a connection topology of the backplane; and
using said connection topology to compare said electrical characteristics.

20. The method of claim 16, wherein disabling communication comprises disabling a port used to couple the at least some of said multiple, coupled devices.

\* \* \* \* \*